Patented Oct. 18, 1932

1,883,106

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

SHOE BOTTOM FILLER

No Drawing.   Application filed July 25, 1928.   Serial No. 295,342.

The usual shoe-bottom filler commonly in use throughout the United States is a mixture of body material such as ground cork, sawdust, leather dust, or the various comminuted materials mentioned in my previous patents, and a plastic binder requiring heat to make the filler spreadable, said spread filler becoming set in the shoe-bottom when it has parted with its heat. This heat requirement calls for the expense and presence of a heating apparatus or machine, as well as additional time and labor because thereof. The object of my present invention is to eliminate the requirement of a machine and of heat and to provide a filler and process which gives the operator a ready-made and ready-to-use product, enabling him to apply the filler immediately cold just as it comes, and with great ease, speed, accuracy and facility, and with results equal to the best hot filler. The filler, as an article of manufacture, is prepared in the form of a thick pasty bulk or mass, by which I mean a dough or doughy compound, evaporable or volatile to the extent of setting as required and no further when spread in a shoe-bottom, to be shipped to the user in a sealed container ready for use. The operator lays it readily cold by hand, with a spatula as mortar is spread. Several attempts have been made toward this end but have had serious defects, such as tending to shrink and dry out after application to the shoe-bottom, some being liable to become brittle and crumble, and in some instances, have been very heavy in weight, and have always proved too slow in evaporating and setting. My present filler eliminates all these disadvantages. It spreads easily cold, is sufficiently waterproof, is non-shrinkable, light in weight, sets more quickly and effectively, strongly adhesive when applied, strongly cohesive (tensile strength) when set, and hardens to a tough, horn-like but flexible, tenacious condition, but no further.

Cold fillers are set forth in several of my patents, viz: 945,294 Jan. 4, 1910 combines a water absorbent component with a water repellent component, the former predominating as a gluey or gelatinous pulpy base and rendering the filler exceedingly slow drying; 1,134,931, April 6, 1915 likewise combines a water absorbent, such as glue or gelatin, with a water repellent, such as resin or a resin naphthalate, and is therefore slow hardening and slow drying, although when made to use cold it contains aqueous dispersed binder materials; and 1,202,454, Oct. 24, 1916 sets forth a highly resilient or lively body material of ground, rubbery, coagulated matter in place of the usual ground cork.

My present invention is an improvement on the last mentioned patent, but differs materially from all the foregoing. A wide range of materials for the compound is employed. The body material or filler base includes ground cork or sawdust or any comminuted product such as mentioned in any of my many filler patents, and combinations thereof, as well as various proportions of inert powders such as pulverized slate, clay etc. Such body material, preferably of the lighter varieties, and, if desired, including fibrous fragmentary substances such as shoddy or other ground waste, is mixed with a binder made wholly or chiefly as a volatile or evaporable paste. Preferably I employ a strength giving material combined with a pasty or gelatinous compound. For example, a paste of tapioca starch carrying a very small amount of rubber latex preferably a water dispersed solution of rubber. Instead of the latter I may employ any uncoagulated gum dispersed in water which will impart to the paste the desired strength. Such a solution is readily admixed with the tapioca paste in a like dispersed form under ordinary conditions of temperature and each acts upon the other to increase the tenacity and the stickiness or binding qualities and cohesion of the filler as a whole when laid and set in the shoe-bottom cavity, and as the whole is in aqueous dispersion or suspension it sets much more quickly than previous cold fillers. The dispersed tapioca paste also greatly facilitates the work of the operator as it acts as a lubricant to speed the spreading and laying of the filler in the shoe-bottom.

Taking the dispersed rubber or creamy latex solution (uncoagulated, and whether vulcanized or not) in its well known liquid condition as a convenient illustration of the strength-giving material, and water dispersed tapioca as a corresponding illustration of the main binder ingredient or vehicle, the combination presents many advantages. The two solutions intermix readily, water being the common dispersing agent, thus making possible a fine subdivision or intermingling of the particles of each. The rubber ingredient, if used alone or predominating, is objectionable because of the prejudice of the shoe trade and wearers of shoes against rubber because of its "drawing" qualities and tendency to sweat the foot, and is objectionable because of its elasticity and contraction when set, whereas a laid filler should be stable and unchangeable in position in the shoe-bottom. So, if used alone or predominating, the rubber or latex is objectionable, if vulcanized, or if the reclaimed variety is used alone, as it ultimately coagulates after laying and the shrinkage originally mentioned herein is largely due to said process of coagulation. When the dispersing agent drops below a certain percentage, coagulation begins at once and hence if the binder is wholly or largely latex or any form of dispersed rubber, and therefore contains a relatively small amount of dispersing agent even at the beginning, it is evident that the condition of shrinkage is liable to become present almost at once upon the laying of the filler. For the same reason it becomes necessary to be especially watchful to keep the containers hermetically sealed until actually ready for the laying process. On the other hand the dispersed tapioca is not rubber-like, is not elastic, does not coagulate, and when combined with the body material of the filler has, when laid in the shoe-bottom, an exceedingly thin film condition, and does not shrink or contract but covers the same area dry as wet. When a very small proportion of the latex or dispersed rubber is mixed with the large amount of tapioca, as stated, the tapioca causes a finer dispersion of both the tapioca and the rubber than would otherwise be possible. By promoting this superfine dispersion of the rubber, the desired great tensile strength is secured in and throughout the filler mass, due to the presence of the tenacious rubber, so that, on the one hand, the naturally frail tensile strength of the tapioca (when set) is counteracted, or is no longer a defect of the filler, and, on the other hand, elastic, contractile, unstable characteristics of the rubber are counteracted. To make the foregoing more apparent, I point out that the dispersed rubber will not, by itself and under the same conditions, extend in the very thin film explained, and will not cover the same area dry as wet, but instead curls up and pulls in or shrinks as it parts with its dispersing agent and coagulates. But, united with the dispersed tapioca, the latter acts as a carrier vehicle for a substantially equally fine dispersion of the rubber along with the main body of tapioca which constitutes the bulk of the binder. As the non-contractive film of the tapioca which extends throughout the ramifications of the filler in and around and about the comminuted cork or other comminuted body material of the filler, dries in place as spread out in the usual thin layer in the shoe-bottom cavity, it carries the lesser amount of the dispersed rubber in a still finer film throughout the mass. This is partly because of the fact that the main vehicle or tapioca carrier is more sticky and hence more pervasive in and among the cork particles and with relation to the innersole and with relation to the rubber particles which in their then condition are practically non-sticky, and largely because the dispersed rubber, being in a much smaller proportion than the dispersed tapioca is therefore carried by the latter to a much more attenuated or dispersed condition than would otherwise be possible. Because, however, of the greater tensile strength of the rubber when later left without its dispersing agent, this extremely attenuated film can be reduced to an entirely harmless amount (harmless as to shrinking influence) without losing its beneficial qualities for which it is employed, namely its finally permanent toughening of the filler layer and elimination of the tendency of the laid filler to break when made with tapioca or similar pastes used alone. On the other hand, if the main or controlling proportion of the binder were the dispersed rubber, and carried a small proportion or amount of the tapioca, or other paste, the contractile feature would predominate or control causing the laid filler to contract or shrink as explained above, thereby producing defective shoe bottoms. To state the matter more graphically, I might say that this feature of my invention incorporates in a main carrying film of the tapioca an equally extended film of rubber but so attenuated and meagre as to constitute barely a skeleton throughout the larger tapioca film, but nevertheless sufficient to impart enough tenacity or toughness to the whole to prevent the tendency to break or fracture which would inevitably be present in said film of tapioca alone. Yet, because the main body of said film consists of the non-contracting tapioca, the natural contracting or shrinking of the coagulative latex or dispersed rubber is inoperative or held permanently in check. The tapioca sets firm, struck tenaciously to the adjacent leather as well as to the cork or other body material constituting the principal mass of the layer. The latex or rubber sets elastic and if by itself would therefore be stretchy and unstable. But the combination of the two, so that the stretchy less adhesive material is dominated and controlled by the non-stretchy, more adhesive material, results in the desired strong, firm, stable filler layer which is without contraction or shrinking, and is fracture-resisting, with horn-like toughness, and yet sufficiently pliable and flexible, and possessed of all the advantages of both types while eliminating the disadvantages of both. All this is accomplished through the agency of a dispersed filler which can therefore be laid cold without any pretreatment, apparatus, fatigue and the like. The quality is greatly improved. For example, a paste filler such as tapioca or any of the other ordinary water-absorbing pastes is still responsive to water, even after having set and even after long use in the shoe. By having introduced the rubber element however, into the paste filler now in the filled shoe, especially in its ultimate coagulated vulcanized condition (which becomes the ultimate or final condition with uncoagulated vulcanized latex used in the original filler paste) the filler layer in the finished shoe is repellent to water in the use of the shoe. Moreover, by using the two principal cooperating ingredients in the form of liquid dispersion, the film forms quicker or sets quicker when the filler is laid than if the liquid is used as a solvent. In other words the layer evaporates its water and hence sets quicker when the water is a dispersing agent, because the water (or whatever the evaporable liquid may be) is then simply around the particles holding them apart, whereas when in a true solution as distinguished from dispersion, the water is within the particles and takes longer to evaporate from and out of the expanded or jellified particles.

In making the filler mixture, I preferably first mix the tapioca paste and ground cork thoroughly together to the usual filler consistency or slightly more fluid, thereby thoroughly coating each granule of cork so as to provide a barrier between the dispersed rubber and the cork, and then the rubber is next introduced into the filler and thoroughly mixed therein. The slimy condition of the mass thus facilitates to the highest extent the spreading or distribution to the most attenuated degree of the particles of the rubbery element whose dispersed particles are therefore held in dispersion in and by the controlling pasty element or barrier and the rubbery element is prevented from getting a direct grip on the cork or having its dispersing agent absorbed thereby. The subsequent action in connection with the spreading of the shoe filler in the shoe bottom cavity brings the dispersed rubbery particles together and permits them to get a direct grip upon each other and upon the cork and adjacent leather surfaces of the shoe. The filler laying process acts, somewhat in the nature of laying mortar with a trowel, to shove, flow, or weld the particles together or to permit the binder particles and body particles to cohere and adhere according to their normal functions which have been held somewhat suspended by their previous dispersion, now broken down by the spreading process. And the slimy dispersed condition of the filler mass at the time of laying renders the filler more spreadable and greatly increases the possibility of speed and efficiency of the laying process. As originally stated, coagulation begins whenever the dispersing agent, i. e. the water, drops below a certain percentage in the compound, or in other words the evaporation of the water in the air and by being absorbed in the cork would start the shrinkage which I have explained is so objectionable. Therefore it is advisable to prevent, as explained, access of the dispersed rubber to the cork so that the latter therefore does not have any chance to absorb the liquefying portion and thereby take it away from the rubbery element, which would not only start the coagulation prematurely, but would prevent its proper dispersion later at the time of laying and spreading out the filler in the shoe-bottom. To still further promote the above, I preferably coat the cork originally with a paste-resisting stop which closes the cork against absorption of the paste, such stop or closing means consisting of wax such as wax tailings or any of that class of binder and waterproofing ingredients mentioned in my filler patents, or with oils or greases or fats. This method of preparation makes the resulting filler layer in the shoe-bottom waterproof or moisture resistant, permanently lighter and it also makes the shipping problem less difficult by preventing the deterioration of the filler body by the absorption of the liquefying agent and hence its premature removal as a liquefying agent. For the practical success of the filler as a ready-made article of commerce, it is necessary that it should retain its plasticity or workable fluidity indefinitely i. e. until used.

While the filler compound may be made with a wide variety of embodiments and proportions, a practical formula consists of 45 parts of tapioca paste, 10 parts dispersed uncoagulated rubber or latex (preferably the vulcanized variety), 15 parts ground cork, 10 parts soluble oil and water or wax tailings, or other waterproofing ingredient, and 20 parts powdered slate, all by weight, and of a consistency which gives the whole mass a fairly thick and yet readily spreadable condition. The vulcanized, uncoagulated caoutchouc-containing material above is described in the Schidrowitz Patent No.

1,443,149, Jan. 23, 1923. By uncoagulated in the claims, I mean that it is substantially so, as it will be understood that it is always uncertain when coagulation begins and its extent, and that further uncertainty is always liable to be present because of the varying relations, exposures, temperature, surrounding conditions, and so forth. Free spreading may be secured by introducing more water, but the latter of course renders the filler slower drying. As will be understood from my plastic filler patents, it is impossible to follow an unvarying formula inasmuch as the filler functions mainly from the mechanical relations of the parts, especially in handling and applying the same, and also because the constituents employed as found in the market vary to such an extent that a fixed formula is of little value. Therefore, as stated in previous patents, the physical conditions or consistencies sought to be attained are a sufficient guide to a skilled workman. It will also be understood that the materials may be varied within the scope of certain of my claims hereinafter, and others substituted from the wide range of filler materials mentioned in the previous patents.

I use tapioca paste because it is always sticky, in fact very sticky, whereas the dispersed rubber or uncoagulated latex, whether vulcanized or not, is not sticky except with water or other dispersing agent, and then only slightly sticky, and alone tends to shrink and curl up. But the two together constitute a remarkable binder, and when mixed with the cork or other body material and pressed down into the shoe-bottom cavity in the process of spreading or laying the filler, these two united binding agents have a tendency under the spreading pressure of the hand spreading tool to move down to the bottom of the filler layer causing the latter to stick to the innersole in a way which is marvelous. This is probably owing to the slimy condition of the tapioca paste, which, under the pressure, oozes through the mass ahead of the tool and carries along with it the thinly divided, tough, rubbery component. Preferably both components are liquid dispersed, as this gives subsequent quick setting, but their use together is new and intended to be covered in certain claims, whether they are used in liquid dispersion or true solution (and therefore slow setting). The tapioca paste is formed of a thick, creamy consistency, and the two solutions mix readily and perfectly, water being the common dispersing agent, thus making possible a fine subdivision and intermingling of the dispersed particles of each. On the expelling of the water or elimination by evaporation due to the spreading action in the shoe-bottom, the finely distributed particles of rubber or latex give a strength to the film which is very advantageous. This latex or aqueous suspension of vulcanized rubber (but not yet coagulated) alone is too rubbery for a proper shoe filler and there is much resistance on the part of the trade to rubber as such in any form in the filler of leather shoes. The tapioca paste introduces a heat resisting element into the laid filler, by which I mean that it does not after being once set, soften again in response to heat, and also it prevents this tendency in the filler if otherwise present because of other heat responsive ingredients. By coating the cork mass with the slippery tapioca paste, the cork is not only protected from penetration thereof by the dispersed rubber, but the process of mixing the cork with the binder as a whole is facilitated. The dispersed rubber liquid is more readily dispersed further among the coated cork particles than would otherwise be possible. The mixing process brings about a close union between the main tapioca-paste base of the binder and the very small proportion of toughening, dispersed rubber. Thus the higher-priced dispersed rubber, although a chief factor in the strength of the filler, becomes a minor factor in the mass as to cost, commercial precautions and difficulties. The relatively unstable tapioca binder is stabilized by the extra toughness of the dispersed rubber or aqueous suspension of vulcanized rubber and at a minimum cost. When the filler is set the combination effects a resistance to the natural influence of moisture upon the tapioca, due to the evaporated and therefore rubbery condition of the rubber element which is now imparted to the whole layer of set filler, this effect being still more pronounced if the latex used is of the vulcanized kind and has therefore now coagulated as a vulcanized or extra-protective film in the laid filler in the finished shoe. The rubber is in turn held in check by the more firm, inelastic and preponderant tapioca film. The adhesion of the naturally sticky tapioca paste improves the adhesive quality of the rubber in the compound and the tenacity of the rubber improves the continuity or permanent adhesion of the tapioca paste in the compound. In other words, a much better grip is secured by combining the two as a binder for the filler body material. The solubility or paste-like consistency of the two binders favors their adhesive functions or combined adhesiveness with relation to the innersole cavity, bringing about an attachment of a most firm, tenacious nature, unlike to that which could be obtained by the use of either of these binding liquids separately. Further advantage to the shoe manufacturer is that this combination of the two aqueous responsive and dispersed elements of the binder paste makes the filler readily reducible by the shoe filling operator with water in case it has become too stiff for him to use easily. The slimy, jellified, cheaper ingredient not only easily coats the body particles, but as a lubricant facilitates the mixing, the carrying of the tougher rubber in a thinner film dispersion, and the subsequent uniform or even spreading. It is an advantage to have all the plastic elements of the filler responsive to a common solvent or dispersing agent. The advantage of quick final conditioning likewise results from the evaporation of the common solvent. The quick final conditioning is dependent on a small proportion of the common solvent. The common solvent or dispersing agent permits complete intermingling of the cooperative binder elements. The common solvent or dispersing agent renders the filler as a whole easily mixed, easily spreadable, and under the pressure of the spreading tool the pasty or easy spreading component becomes the strong adhesive agent. For the same reason the tapioca paste becomes the carrier in a superior degree for the dispersed or suspended rubber and the combined mass when solidified or stabilized by evaporation and coagulation, forms a permanent, plastic, non-shrinkable, highly pliable, tenacious film, strongly adherent to the shoe-bottom and to the body material of the filler.

What I claim is:

1. A shoe filler mixture in the form of a plastic mass, as an article of manufacture, composed of a comminuted body material intermixed with a binder containing a liquid dispersed coagulable material in uncoagulated, vulcanized condition which becomes coagulated throughout the mass upon parting with its dispersing liquid after being laid in the shoe-bottom.

2. A shoe filler mixture in the form of a plastic mass, as an article of manufacture, composed of a comminuted body material intermixed with a binder containing an adhesive of vegetable origin in an aqueous colloidal dispersion mixed with a caoutchouc-containing element in a dispersed condition for adding tensile strength in the final filler layer.

3. A shoe filler mixture in the form of a plastic mass, as an article of manufacture, composed of a comminuted body material intermixed with a binder containing tapioca in an aqueous colloidal dispersion mixed with a caoutchouc-containing element in a dispersed condition for adding tensile strength.

4. A shoe filler, comprising comminuted body material, united with a binder comprising caoutchouc-containing material in a dispersed condition, and means for overcoming the contracting tendency of the elastic material in the laid filler and for preventing the layer from shrinking upon the evaporation of the dispersing agent when laid as a layer in the shoe-bottom.

5. A shoe filler, comprising comminuted body material united in a pasty, plastic mass with a binder comprising a jelly-like, sticky component normally brittle when set and a subordinate toughening component in amount capable of overcoming said brittleness of the sticky component in the filler layer when laid as a layer in the shoe-bottom and thereby giving to said layer a leather-like quality.

6. A shoe filler, comprising comminuted body material and dispersed binder, containing a main binder element of non-rubbery, non-elastic binder material such as tapioca which naturally has frail tensile strength and tends to dry out brittle, intermixed in proportions and relation restricting said dispersed binder element to a thin or attenuated non-shrinking film condition about the body particles, and a subordinate proportion of dispersed coagulable rubber likewise intermixed with the aforesaid body material and main binder, the whole constituting a filler which is spreadable, the proportions and conditions of the aforesaid mixture being such as to maintain the two dispersed elements thereof together in said fine film enveloping relation about the body particles and with the rubber element covering substantially the same area dry as when wet, and held permanently against curling and pulling in or shrinking as it parts with its moisture and coagulates.

7. A shoe filler, comprising an intermixture of comminuted body material and binder united to a self-supporting, spreadable consistency, capable of setting to a stable condition when laid in a shoe bottom cavity, said binder containing a main controlling element in relatively large bulk of pasty, adhesive material, tending to dry brittle if alone, and a subordinate controlled element in relatively small bulk of rubbery, normally elastic and shrinking material, the said main element being sufficiently controlling as a carrier of the lesser rubbery element to disseminate the latter in a sufficiently attenuated and pervasive condition throughout the main bulk of the binder to control the elasticity and prevent any appreciable shrinking influence in the filler when laid, and the said rubbery element being proportioned to toughen the entire filler against liability to break or become brittle when laid in the shoe bottom cavity.

8. A shoe filler comprising an intermixture of comminuted body material and binder, said binder being in the form of a main carrying film of tapioca having incorporated therein a coextensive element of rubber so attenuated and meager as to constitute mechanically in the filler when laid in the shoe bottom cavity barely a toughening skeleton throughout the predominating tapioca film without contractile influence on the filler, sufficient merely to impart tenacity and toughness to the whole filler to prevent the otherwise natural tendency to break or fracture when laid in the shoe bottom cavity, said filler being self-supporting and spreadable for said laying and constituting when laid a strong, firm, flexible, adherent, stable, filler-layer with hornlike toughness.

9. A shoe filler, comprising comminuted body material intermixed to spreadable consistency with a binder, said binder containing two principal cooperating ingredients, one ingredient being pasty and slimy and holding the other ingredient dispersed therein to a highly attenuated degree throughout the filler mass, said other ingredient being rubbery, tough and strong in binding capacity but held by said pasty ingredient from getting a direct grip on the body material before laying, the dispersed toughening and strength-giving particles of the rubbery ingredient being so positioned and held in the binder as to be brought into gripping relation with the body material and with each other in the process of spreading the shoe filler in a shoe bottom cavity and said filler being rendered highly spreadable by the slimy capacity of the filler mass.

10. A shoe filler comprising comminuted body material and binder in a dispersed state, said binder containing an adhesive material in aqueous suspension, which tends to dry out in brittle condition of frail tensile strength, and an uncoagulated, but coagulable, rubber-like, toughening material, also dispersed in aqueous suspension with said adhesive material, adapted, upon the removal of the dispersing agent, to coagulate into an attenuated net-work or skeleton of tough elastic filaments ramifying throughout the more brittle adhesive, thereby toughening the filler as a whole against tendency to break or become brittle.

Signed my me at Cambridge, Massachusetts, this twenty-fourth day of July 1928.

ANDREW THOMA.